(12) United States Patent
Ahmed et al.

(10) Patent No.: US 11,968,606 B2
(45) Date of Patent: Apr. 23, 2024

(54) CLOUD-BASED VEHICLE COMMUNICATION MANAGER

(71) Applicant: FORD GLOBAL TECHNOLOGIES, LLC, Dearborn, MI (US)

(72) Inventors: Hanan J. Ahmed, Belleville, MI (US); Hassan Halabian, Kanata (CA); Erick Michael Lavoie, Van Buren Charter Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 17/671,035

(22) Filed: Feb. 14, 2022

(65) Prior Publication Data

US 2023/0262432 A1 Aug. 17, 2023

(51) Int. Cl.
*H04W 4/44* (2018.01)
*B60L 58/12* (2019.01)
*H04W 4/029* (2018.01)

(52) U.S. Cl.
CPC .............. *H04W 4/44* (2018.02); *B60L 58/12* (2019.02); *H04W 4/029* (2018.02)

(58) Field of Classification Search
None
See application file for complete search history.

(56) References Cited

U.S. PATENT DOCUMENTS

| 10,035,517 B2 | 7/2018 | Lovett et al. |
| 10,394,251 B2 | 8/2019 | Dierker et al. |
| 11,050,813 B2 | 6/2021 | Sabella et al. |

FOREIGN PATENT DOCUMENTS

| WO | 2021067140 A1 | 4/2021 | |
| WO | WO-2021062256 A1 * | 4/2021 | ............. H04L 67/10 |
| WO | WO-2021127710 A2 * | 6/2021 | |

* cited by examiner

*Primary Examiner* — Adolf Dsouza
(74) *Attorney, Agent, or Firm* — Joseph Zane; Brooks Kushman P.C.

(57) ABSTRACT

Cloud-based communication management is provided. Status information regarding vehicles is maintained to a non-volatile storage. A request intended to be performed by one of the vehicles is received to a cloud server over a communications network from a requesting device. Responsive to the request being performable by a mobile edge computing (MEC) device in a cell of the communications network instead of the one of the vehicles, the request is sent by the cloud server to the MEC device to be processed by the MEC device instead of being performed by the one of the vehicles.

25 Claims, 4 Drawing Sheets

US 11,968,606 B2

CLOUD-BASED VEHICLE COMMUNICATION MANAGER

TECHNICAL FIELD

Aspects of the present disclosure generally relate to cloud-based communication management for vehicle requests.

BACKGROUND

Requests may be received by a vehicle. This may cause the vehicle to wake up communication components (and other internal components depending on the request) to process the requests. The vehicle may reject a request if certain conditions are met, such as a predefined battery threshold is reached or if the resources required for running the feature are unavailable.

SUMMARY

In one or more illustrative examples, a system for cloud-based communication management is provided. The system includes a non-volatile storage configured to maintain status information for vehicles. The system also includes a cloud server programmed to receive, over a communications network, a request from a requesting device, the request intended to be performed by one of the vehicles, and responsive to the request being performable by a mobile edge computing (MEC) device in a cell of the communications network instead of the one of the vehicles, send the request to the MEC device to be processed by the MEC device instead of being performed by the one of the vehicles.

In one or more illustrative examples, a method for cloud-based communication management is provided. Status information regarding vehicles is maintained to a non-volatile storage. A request intended to be performed by one of the vehicles is received to a cloud server over a communications network from a requesting device. Responsive to the request being performable by a MEC device in a cell of the communications network instead of the one of the vehicles, the request is sent by the cloud server to the MEC device to be processed by the MEC device instead of being performed by the one of the vehicles.

In one or more illustrative examples, a non-transitory computer readable medium includes instructions for cloud-based communication management that, when executed by a cloud server in communications over a communications network, cause the cloud server to perform operations comprising to receiving status information from vehicles, the status information indicative of vehicle location, state of charge, whether the vehicles are being used as a power source, and whether the vehicles are in a parked state or a motive state; maintain the status information regarding the vehicles to a non-volatile storage; receive, over the communications network, a request from a requesting device, the request intended to be performed by one of the vehicles; and responsive to the request being performable by a MEC device in a cell of the communications network instead of the one of the vehicles, send the request to the MEC device to be processed by the MEC device instead of being performed by the one of the vehicles.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Figure 1:
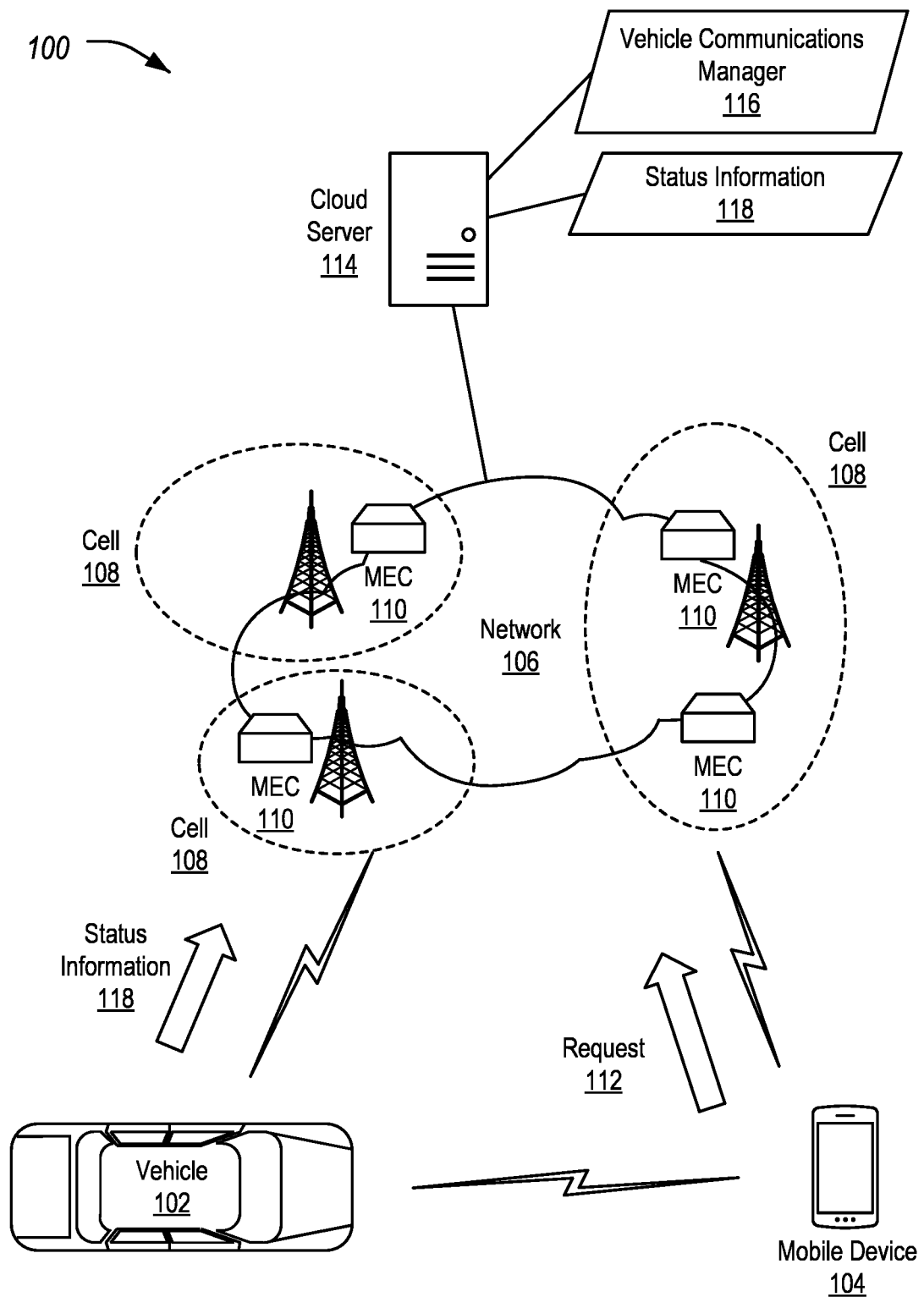
FIG. 1 illustrates an example system utilizing a cloud-based communication manager for managing communications to vehicles.

FIG. 1 illustrates an example system 100 utilizing a cloud-based communication manager 116 for managing communications to vehicles 102. The vehicles 102 of the system 100 may be configured to receive, over a communications network 106, requests 112 from other vehicles 102, from mobile devices 104, and/or from a cloud server 114 hosting the communication manager 116. As explained in further detail herein, the communication manager 116 may determine whether the requests 112 should be handled by the vehicles 102, by the cloud server 114, or by MEC 110 devices of cells 108 of the communications network 106.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs).

The vehicle 102 may include a plurality of controllers configured to perform and manage various vehicle 102 functions under the power of the vehicle battery and/or drivetrain. As some non-limiting vehicle controller examples: a powertrain controller may be configured to provide control of engine operating components (e.g., idle control components, fuel delivery components, emissions control components, etc.) and for monitoring status of such engine operating components (e.g., status of engine codes); a body controller may be configured to manage various power control functions such as exterior lighting, interior lighting, keyless entry, remote start, and point of access status verification (e.g., closure status of the hood, doors and/or trunk of the vehicle 102); a radio transceiver controller may be configured to communicate with key fobs, mobile devices 104, or other local vehicle 102 devices; an autonomous controller may be configured to provide commands to control the powertrain, steering, or other aspects of the vehicle 102; a climate control management controller may be configured to provide control of heating and cooling system components (e.g., compressor clutch, blower fan, temperature sensors, etc.); a global navigation satellite system (GNSS) controller may be configured to provide vehicle location information; and a human-machine interface (HMI) controller may be configured to receive user input via various buttons or other controls, as well as provide vehicle status information to a driver, such as fuel level information, engine operating temperature information, and current location of the vehicle 102. The vehicle 102 may also be configured to power other devices external to the vehicle using the vehicle battery and/or drivetrain.

The vehicle bus may include various methods of communication available between the vehicle controllers, as well as between the telematics control unit (TCU) and the vehicle controllers. As some non-limiting examples, a vehicle bus may include one or more of a vehicle controller area network (CAN), an Ethernet network, and a media-oriented system transfer (MOST) network. Further aspects of the layout and number of vehicle buses are discussed in further detail below. The TCU may include network hardware configured to facilitate communication between the vehicle controllers and with other devices of the system 100. For example, the TCU may include or otherwise access a cellular modem configured to facilitate communication with other vehicles 102 or with infrastructure. The TCU may, accordingly, be configured to communicate over various protocols, such as with a communication network over a network protocol (such as Uu). The TCU may, additionally, be configured to communicate over a broadcast peer-to-peer protocol (such as PC5), to facilitate cellular vehicle-to-everything (C-V2X) communications with devices such as other vehicles 102. It should be noted that these protocols are merely examples, and different peer-to-peer and/or cellular technologies may be used.

The mobile device 104 may be any of various types of portable computing device, such as cellular phones, tablet computers, smart watches, laptop computers, portable music players, or other devices having processing and communications capabilities. The mobile device 104 may include one or more processors configured to execute computer instructions, and a storage medium on which the computer-executable instructions and/or data may be maintained.

The mobile device 104 may further include various wireless transceivers, such as a BLUETOOTH or BLUETOOTH Low Energy (BLE) transceiver, as well as a transceiver for communication over the communications network 106. The communications network 106 may include one or more interconnected communication networks such as the Internet, a cable television distribution network, a satellite link network, a local area network, and a telephone network, as some non-limiting examples. The vehicle 102 may also include a TCU. The TCU may include network hardware configured to facilitate communication between the vehicle 102 and other devices of the system 100. For example, the TCU may include or otherwise access a cellular modem configured to facilitate communication with the communications network 106.

The communications network 106 may include one or more cells 108 including networking and computing resources. In an example, the cells 108 may include antennas configured to wirelessly communicate with the wireless transceivers of the devices of the system 100. In another example, the cells 108 may include one or more MECs 110 configured to provide computing resources to the cells 108. As the MECs 110 are located at the periphery of the communications network 106, the MECs 110 may be able to handle computing tasks local to the devices in communication with the communications network 106, without the transmission of data through the communications network 106.

The requests 112 may include various messages that are sent to the vehicles 102. The requests 112 may be configured to cause the vehicle 102 to perform various operations, such as lock, unlock, start, autonomously move to a specified location, provide a video feed from a camera of the vehicle 102, download a music file to the vehicle 102, or provide vehicle 102 fuel or other status information. Thus, the requests 112 may be of different priorities (e.g., important, informational, desirable). Also, the requests 112 may be of different time sensitivities (e.g., turning the vehicle 102 on may be of higher priority than downloading a music file). The processing of the requests 112 may consume battery, even during ignition off of the vehicle 102, by running processes and waking up controllers of the vehicle 102. Some requests 112 may be initiated from the mobile devices 104, while others are cloud initiated, while yet others are set to run periodically.

The cloud server 114 may be an example of a networked computing device that is accessible to the vehicle 102 and/or the mobile device 104 over the communications network 106. The communication manager 116 may be an example of an application executed by the cloud server 114. The communication manager 116 may be configured to help vehicles 102 in an off state (e.g., ignition off) or an electric vehicle (EV) at any ignition state control communication flow between the communications network 106 and the vehicle 102 to lower the impact of requests 112 on vehicle 102 state of charge. Managing communications may also help lower communication burden (at any ignition state). The communication manager 116 may accordingly enhance users experience and aid in the integration of the vehicle 102 into an overall digital experience.

Not all communication to the vehicle 102 from the mobile devices 104 or the cloud servers 114 is critical or time sensitive. In extreme cases, unfiltered requests 112 sent to the vehicle 102 may result in draining the battery or a denial-of-service scenario by continuously occupying vehicle 102 processors.

The communication manager 116 may be configured to receive status information 118 from the vehicles 102. This status information 118 may include information such as battery state of charge. The communication manager 116 may be further configured to receive other information from the vehicles 102 as well, such as driver patterns and behavior, and environmental information with respect to the surroundings of the vehicles 102. As some specific examples, the status information 118 may include, for instance, vehicle type, ignition status (e.g., on, off), charger connection status (e.g., charger connected, charger disconnected), last recorded state of charge (SoC) and/or estimated SoC, and a list of active features available by the vehicle 102 (e.g., sentinel cameras, remote start, cabin preconditioning, etc.). The status information 118 may also include, as some further examples, available communications interfaces to the communications network 106 (e.g., cellular, WiFi, BLUETOOTH, BLE, etc.), whether the vehicle 102 is in a roaming connectivity zone, location of the vehicle 102, current weather conditions, etc. The status information 118 may also include whether the vehicle 102 is being used as a power source for external devices, such as powering equipment for a home, for a construction site, while camping, etc.

The communication managers 116 may also have access to the source, nature, and urgency of the request 112 to aid in deciding how to handle the request 112 to optimize power consumption and communications without sacrificing functionality.

Figure 2:
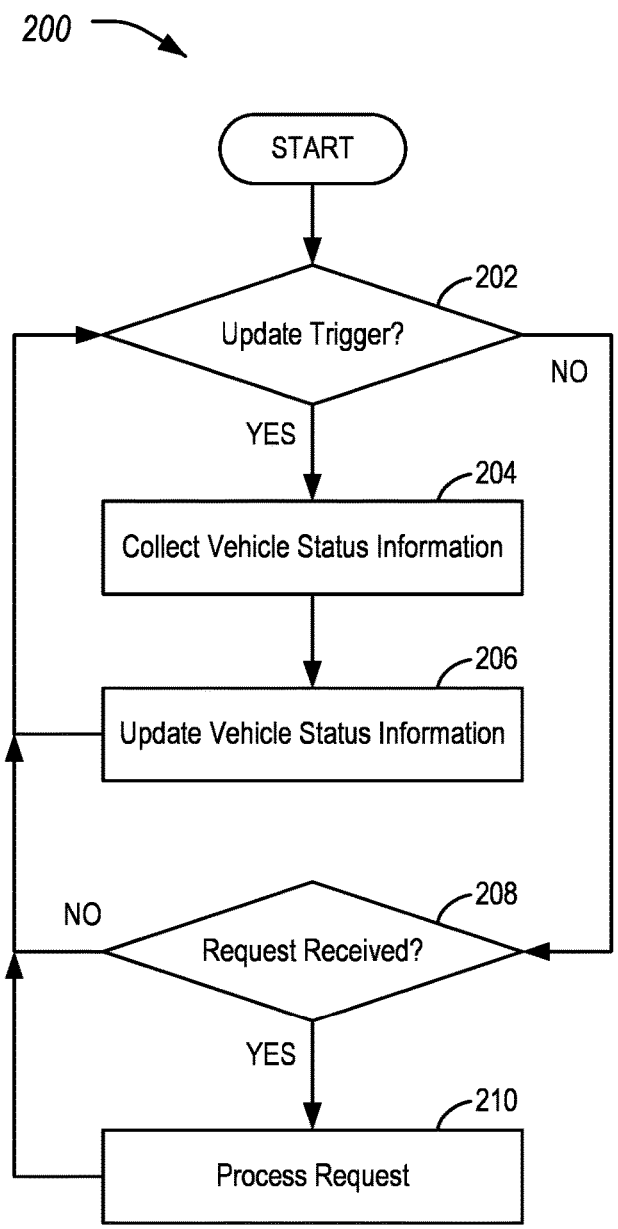
FIG. 2 illustrates an example process for the operation of a vehicle in the context of the communication manager.

FIG. 2 illustrates an example process 200 for the operation of a vehicle 102 in the context of the communication manager 116. In an example the process 200 may be performed by the vehicle 102 in the context of the system 100.

At operation 202, the vehicle 102 determines whether an update trigger has occurred to update the status information 118 to the communication manager 116. In an example, the trigger may be the vehicle 102 being turned off (e.g., a key-off). In another example, the trigger may be expiration of a periodic timer (e.g., hourly, every 4 hours, etc.). If an update is triggered, control passes to operation 204. Otherwise, control passes to operation 208.

At operation 204, the vehicle 102 collects the status information 118 for the vehicle 102. In an example, a TCU or other controller of the vehicle 102 may capture the SoC, location, on or off status, ambient weather, etc. to provide to the communication managers 116.

At operation 206, the vehicle 102 updates the vehicle 102 status to the communication manager 116. In an example the vehicle 102 sends the collected status information 118 over the communications network 106 to the cloud server 114 to be received by the communication manager 116.

At operation 208, the vehicle 102 determines whether a request 112 is received. In an example, the vehicle 102 may receive the request 112 from a device over the communications network 106. The device may be another vehicle 102, a mobile device 104, and/or the cloud server 114 hosting the communication manager 116.

At operation 210, the vehicle 102 processes the request 112. For example, the vehicle 102 may turn on responsive to a start request 112, may unlock response to an unlock request 112, may download a file response to a download request 112, may activate heating, ventilation, and air conditioning (HVAC) responsive to a cabin preconditioning request 112, etc. After operation 210, control returns to operation 202.

Figure 3:
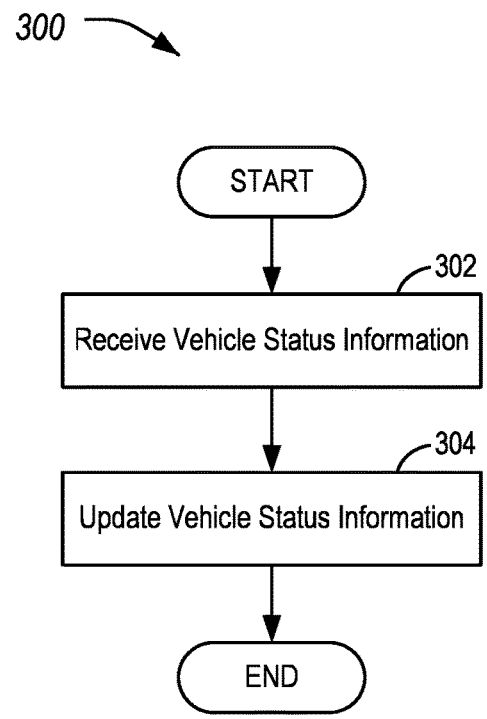
FIG. 3 illustrates an example process for the communication manager to update the status information with respect to the vehicles.

FIG. 3 illustrates an example process 300 for the communication manager 116 to update the status information with respect to the vehicles 102. In an example, the process 300 may be executed by the cloud server 114 hosting the communication manager 116 in the context of the system 100.

At operation 302, the communication manager 116 receives status information 118 from a vehicle 102. In an example, the communication manager 116 of the cloud server 114 may receive the status information 118 sent by the vehicle 102 at operation 206 of the process 200.

At operation 304, the communication manager 116 updates the status information 118 maintained by the communication managers 116 to reflect the current status of the vehicle 102. In an example, the communication manager 116 may maintain, to the cloud server 114 a data store of current status information 118 for a plurality of vehicles 102. This information may be indexed according to identifier of the vehicle 102 for later lookup. Example identifies may include VIN, uniquely assigned globally unique identifiers (GUIDs), randomly assigned identifiers of the vehicle 102, identifiers of accounts of the vehicles 102 with the communication manager 116, etc. After operation 304, the process 300 ends.

Figure 4:
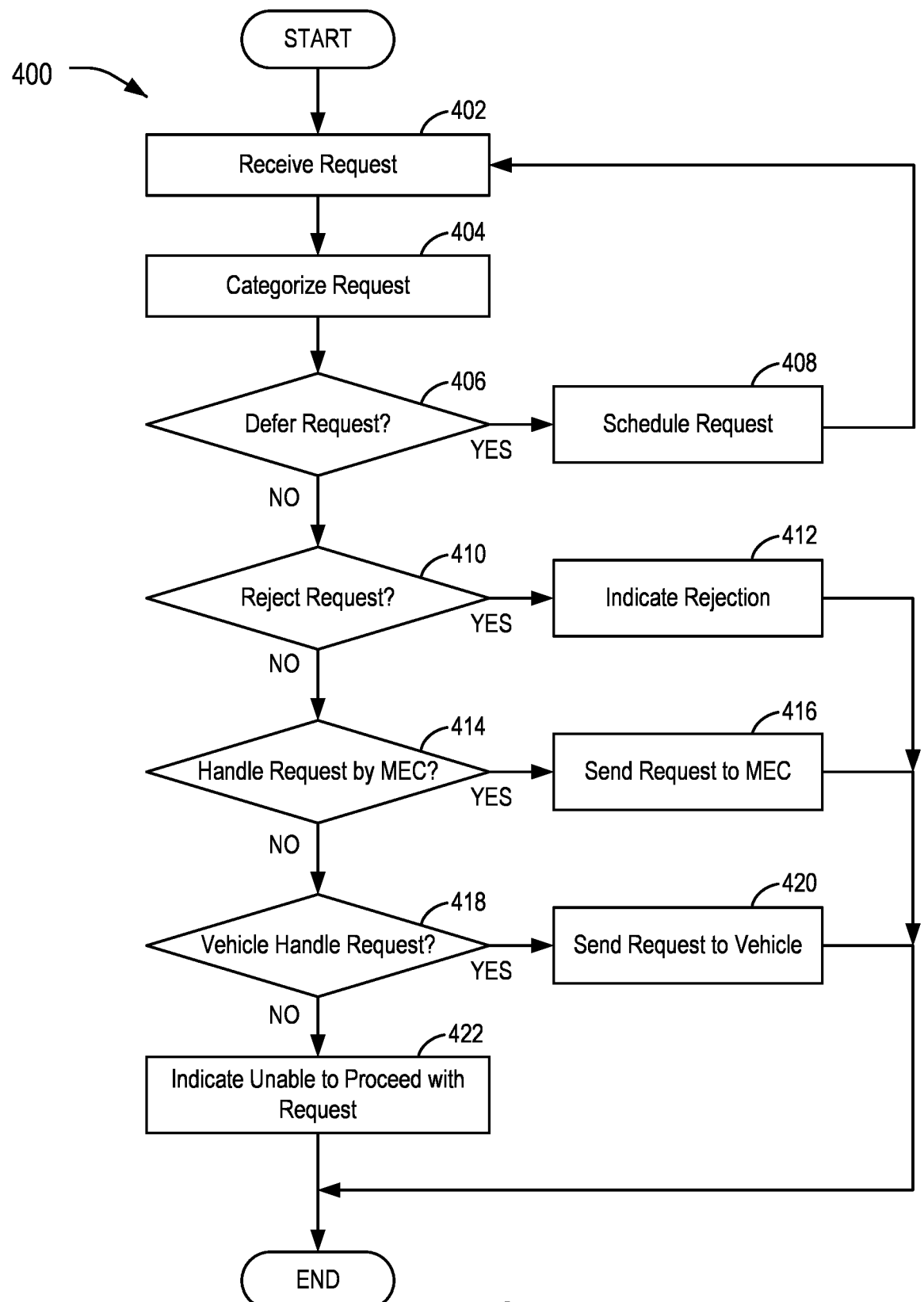
FIG. 4 illustrates an example process for the communication manager to manage the requests being sent to the vehicles; and vehicles.

FIG. 4 illustrates an example process 400 for the communication manager 116 to manage the requests 112 being sent to the vehicles 102. In an example, as with the process 300, the process 400 may be executed by the cloud server 114 hosting the communication manager 116 in the context of the system 100.

At operation 402, the communication manager 116 receives a request 112. In an example, the request 112 may be received from a vehicle 102 or a mobile device 104. In another example, the request 112 may be generated by the cloud server 114, e.g., as part of a periodic process of sending requests 112 to the vehicles 102. The request 112 may be of various types, such as a request 112 to start the vehicle 102, a request 112 to receive a video feed from a camera of the vehicle 102, a request 112 to precondition the cabin of the vehicle 102, a request 112 for the location of the vehicle 102, a request 112 to download a file to the vehicle 102, etc.

At operation 404, the communication manager 116 categorizes the request 112. In an example, the communication manager 116 may categorize the request 112 based on factors such as whether the request 112 is priority (e.g., invoking a vehicle 102 alarm, displaying a video feed from the vehicle 102, downloading an important software update to the vehicle 102), whether the request 112 is informational (e.g., to receive the location of the vehicle 102, the SoC of the vehicle 102), whether the request 112 is for customer pleasure (e.g., to precondition the cabin of the vehicle 102, to download a media file to the vehicle 102), etc.

In another example, the communication manager 116 may categorize the request 112 as time-sensitive or non-time-sensitive. For instance, a download of a media file may be indicated as non-time-sensitive, while a download of a required software update may be indicated as time-sensitive.

In yet another example, the communication manager 116 may categorize the request 112 as whether or not an external condition is required to be satisfied for performance of the request 112. For instance, a request 112 may involve a download of a large file that should be performed on WiFi as opposed to with cellular connectivity. In such a situation, the request 112 may have an external condition of WiFi connectivity. In another example, the download request 112 may involve the external condition of being downloaded cellularly at a time where the data rate is cheaper (e.g., at night), even if the request 112 is made during the day.

As another categorization, the communication manager 116 may categorize the request 112 by requester. For instance, requests 112 made by a vehicle 102 owner or fleet operator may be considered higher priority than requests 112 from other parties. For instance, if a fleet operator makes a request 112 for the location of the vehicle 102, that request may be higher priority than a request 112 for the same location made by a friend of the vehicle 102 operator.

As an even further categorization, the communication manager 116 may categorize the request 112 by frequency.

For instance, if the same or a similar request 112 was recently made, then that may lower the priority of making the same request 112 again. In one example, if there is only short time between requests for vehicle 102 information (e.g., location, SoC, etc.) then this information may be unlikely to have changed, thereby lowering the priority of the request 112.

In another categorization, the communication manager 116 may categorize the request 112 as having been approved by the vehicle 102 owner or fleet operator. For instance, the communication manager 116 may send a confirmation of the request 112 to the mobile device 104 of the vehicle 102 owner or fleet operator. If the vehicle 102 owner or fleet operator approves the request 112 then the request 112 may be considered to be of higher priority than if the request 112 is not approved or is rejected.

In still another categorization, the communication manager 116 may modify the categorization of the requests 112 based on the SoC of the vehicle 102. If the SoC is low, then the priority of the request 112 may be lowered and made optional.

In still another categorization, the communication managers 116 may query the MECs 110 in the cell 108 to which the vehicle 102 is connected to determine the capabilities of the MECs 110 in handling the request 112 instead of the vehicle 102 handling the request 112. For instance if the request 112 is for vehicle 102 information and that information is cached to the MEC 110 from a previous request 112 responded to by the vehicle 102, then the MEC 110 may be able to handle the request 112. In another example, if the MEC 110 has available hardware such as a camera feed, then the MEC 110 may be able to handle the request 112 using the available hardware of the MEC 110 instead of using the vehicle 102 hardware.

At operation 406, the communication manager 116 determines whether to defer the request 112. In an example, based on the categorization the communication manager 116 may determine that the request 112 should be performed at a later time. For instance, if the request 112 is categorized as requiring an external condition is required to be satisfied, then the communication manager 116 may schedule that request 112 to be performed when the external condition is satisfied. For instance, if data rates are lower at a predefined time then the communication manager 116 may schedule the request 112 to be performed at that time. It should be noted that the scheduling may not involve a time that is certain when the determination to schedule is made. For instance, the communication manager 116 may defer the request 112 until the vehicle 102 reports Wi-Fi connectivity, as another example.

If the communication manager 116 determines to schedule the request 112, control passes to operation 408 to do so. If not, the process 400 continues to operation 410. At operation 408, the scheduling of the request 112 may include maintaining the request 112 in storage at the cloud server 114 for later processing. Responsive to the condition being met, the process 400 may restart with the request 112 to allow the request 112 to again be processed by the vehicle 102, MEC 110, etc.

At operation 410, the communication manager 116 determines whether to reject the request 112. In an example, the communication manager 116 may determine, based on the categorization, that the request 112 should not be performed. In one example, the communication manager 116 may determine that the SoC of the vehicle 102 is insufficient to wake the vehicle 102 to process the request 112. In another example, the communication manager 116 may have sent a confirmation to proceed to a mobile device 104 of an owner or operator of the vehicle 102, and that confirmation may have resulted in a denial of the request 112. If the request 112 is rejected, control passes to operation 412. If not, control continues to operation 414.

At operation 412, the communication manager 116 indicates the rejection of the request 112. In an example the communication manager 116 may indicate the rejection of the request 112 in a response message to the requesting vehicle 102, mobile device 104, or cloud server 114. In another example, the communication manager 116 may indicate the rejection of the request 112 to the mobile device 104 of the owner or operator of the vehicle 102. After operation 412, the process 400 ends.

At operation 414, the communication manager 116 determines whether to handle the request by a MEC 110. For instance, based on the categorization or categorizations performed at operation 404, the communication manager 116 may instead determine to forward the request 112 to a MEC 110 in the same cell 108 as the vehicle 102 is connected to the communications network 106. This may be done, for example, in cases where the MEC 110 may serve to perform the request 112 for the vehicle 102 based on the categorization. If the communication manager 116 determines to have the MEC 110 handle the request 112, control passes to operation 416. Otherwise, control passes to operation 418.

An example of the MEC 110 performing the processing may be where the request 112 is for information that the vehicle 102 has recently provided. In some examples, when vehicles 102 provided information responsive to requests 112, that information may be cached to the MEC 110 in the same cell 108 of the communications network 106 as the vehicle 102. In such an example, the communication manager 116 may proceed to operation 416, at which the communication manager 116 sends the request to the MEC 110 for processing. The MEC 110 may then return the cached information back to the originator of the request 112. This allows for the request 112 to be handled without waking the vehicle 102.

In another example, the request 112 may be for a camera feed of the vehicle 102. The communication manager 116 may have queried the MEC 110 in the cell 108 of the vehicle 102 and may be aware that the MEC 110 has a camera in the vicinity of the vehicle 102. In such an example, the communication manager 116 may proceed to operation 416, at which the communication manager 116 sends the request to the MEC 110 for processing. Thus, the communication manager 116 may sent the request 112 to the MEC 110 to have the MEC 110 provide the camera feed as opposed to the vehicle 102. In this example too, this also allows for the request 112 to be handled without waking the vehicle 102.

At operation 418, the communication manager 116 determines whether to handle the request 112 by the vehicle 102. Based on the categorization or categorizations performed at operation 404, the communication manager 116 determines whether to forward the request 112 to the vehicle 102. For instance, if one or more of: the request 112 is considered high priority, the request 112 is made by the owner or operator of the vehicle 102, the request 112 has an external condition for execution that is satisfied, the request 112 is approved by owner or operator of the vehicle 102, etc., then control passes to operation 420. At operation 420, the communication manager 116 sends the request 112 to the vehicle 102. Thus, the communication manager 116 causes the vehicle 102 to wake and process the request. An example of vehicle 102 processing of requests 112 is discussed with respect to operations 208 and 210 of the process 200. After operation 420, the process 400 ends.

If, however, the vehicle 102 is unable to handle the request 112, and the MEC 110 is also unable to handle the request 112 as noted earlier in the process 400, control proceeds to operation 422 to indicate that the request 112 cannot be performed. In an example, this notification that the request 112 cannot be performed may be provided to the requesting device. In another example, this notification may be provided to the device of an owner and/or operator of the vehicle 102. After operation 422, the process 400 ends.

The illustrated systems 100 and processes 200, 300, and 400 may be used to provide for various use cases. As one example, the communication manager 116 may receive a noncritical request 112 for a movie to be downloaded to the vehicle 102. The communication manager 116 may recognize from the status information 118 that the last known SoC of the vehicle 102 is low. Or, the communication manager 116 may determine that an expected commute of the vehicle 102 that is scheduled or historically performed by the vehicle may consume more energy than usual due to predicted weather conditions. Or, the communication manager 116 may determine that the vehicle 102 is already processing or scheduled to process a higher priority request 112, such as a software update. In these types of use cases, the communication manager 116 may respond to the request 112 either with an alert and/or may seek a confirmation from the vehicle 102 owner or operator to continue with the request 112.

As another example use case, the communication manager 116 may receive a non-time-sensitive request 112, such as an application update. The communication manager 116 may determine that the data rate at the current time is expensive, e.g., as the vehicle 102 is roaming according to the status information 118 or that cellular coverage for the communications network 106 is poor and therefore higher power at the location indicated by the vehicle 102 in the status information 118. In such an example, the communication manager 116 may reject the request 112 as being unlikely to succeed and/or having an unjustifiable burden on SoC for the vehicle 102.

As yet another use case, the communication manager 116 may receive repeated requests 112. The communication manager 116 may determine that the source of these requests 112 is not a vehicle 102 owner or operator based on the origin address of the requests 112. The communication manager 116 may accordingly send a confirmation to the mobile device 104 of the owner or operator to ensure that the owner or operator gives permission for the request 112 to be performed. This may also allow the owner or operator to disable and/or delay execution of the request 112. Moreover, if the communication manager 116 receives many such requests 112 from a common origination address, or to a specific vehicle 102 or vehicles 102, then the communication manager 116 may flag the requests 112 as a possible hacking attempt.

In another user case, the communication manager 116 may receive a request 112 for mileage of the vehicle 102. From the status information 118, the communication manager 116 may determine that the vehicle 102 has not moved since the last mileage of the vehicle 102 was indicated to the communication manager 116 (or to the MEC 110 in the same cell 108 as the vehicle 102). In such a case, the communication manager 116 may reply to the request 112 using status information 118 stored to the cloud server 114. Or the communication manager 116 may forward the request 112 to the MEC 110 to be handled there. With either approach, the vehicle 102 is not required to be woken up.

It should be noted that the owner or operators of the vehicle 102 may be able to utilize the communication manager 116 to manage the criteria for categorizing or otherwise handling the various requests 112. For instance, rather than being notified and responding to each confirmation sent by the communication manager 116, the user may provide presets that are to be automatically performed by the communication manager 116. For instance, these presets may be set such that the user must confirm before execution of the request 112. Or, these presets may be set such that requests 112 to be executed during predefined times, predefined locations (e.g., geofences), or under certain conditions (e.g., charging) are allowed, disallowed, or require confirmation from the user. The user may also manage the criteria of which requests 112 may be performed generally. For instance, the user may set the presets to disable certain features when the SoC or fuel level of the vehicle 102 is below a predefined threshold value, if the temperature is below a predefined threshold, if upcoming expected travel of the vehicle 102 requires the remaining charge or fuel, etc.

The communication manager 116 may also help manage notifications of services, upcoming battery charging need, trip planning by processing the status information 118 on the cloud server 114 and not the vehicle 102 and by incorporating the learned historical behavior of the vehicle 102 and the user profile presets.

Figure 5:
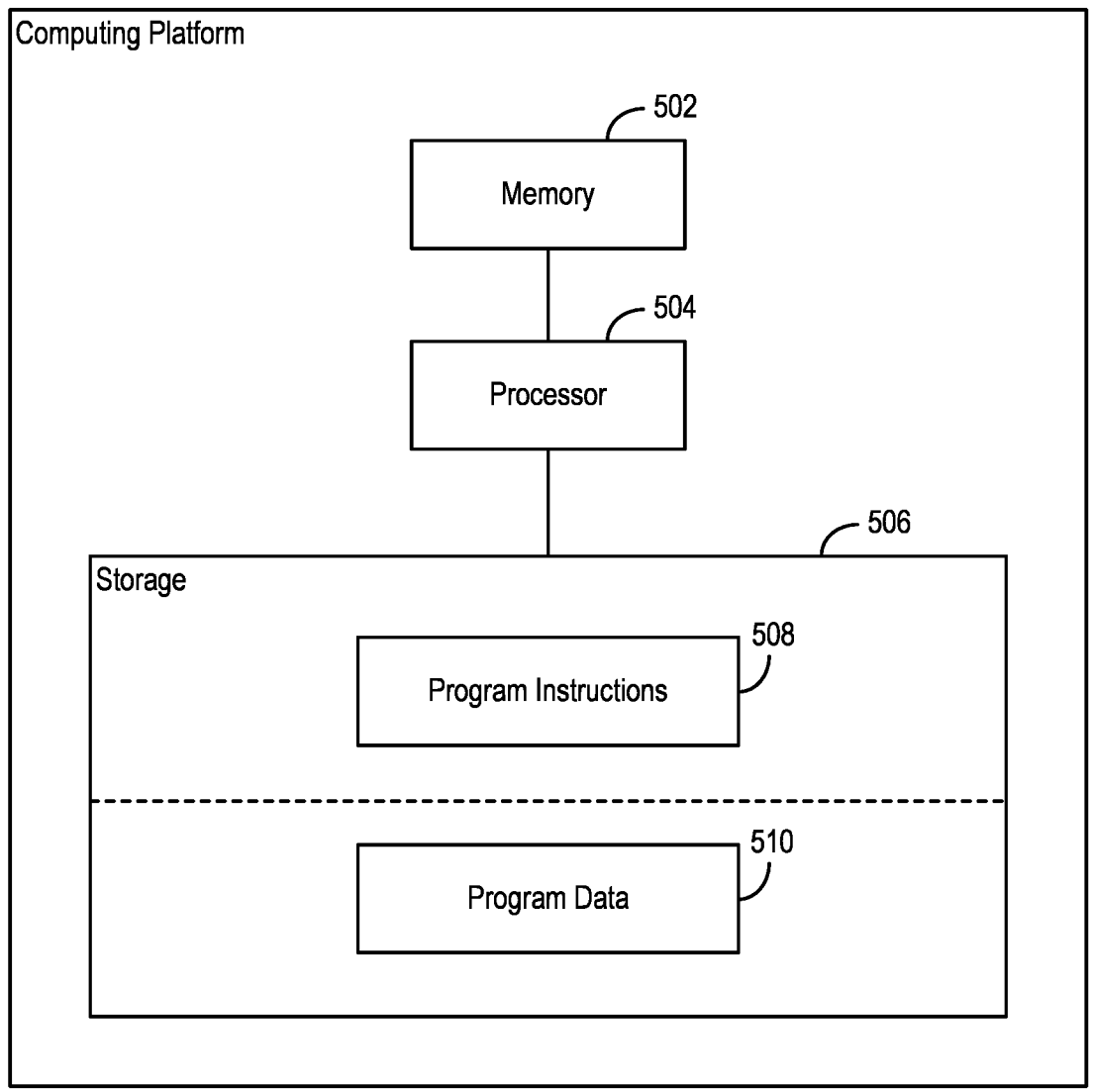
FIG. 5 illustrates an example computing device for managing communications to vehicles.

FIG. 5 illustrates an example computing device 500 for managing communications to vehicles 102. Devices discussed herein, such as the vehicles 102, the mobile devices 104, and the cloud server 114 may include devices such as the computing device 500. Likewise, the operations performed herein, such as those of the processes 200, 300, and 400, may be implemented with such a computing device 500. The computing device 500 may include memory 502, processor 504, and non-volatile storage 506. The processor 504 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 502. The memory 502 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 506 may include one or more persistent data storage devices such as a hard drive, optical drive, tape drive, non-volatile solid-state device, cloud storage or any other device capable of persistently storing information.

The processor 504 may be configured to read into memory 502 and execute computer-executable instructions residing in program instructions 508 of the non-volatile storage 506 and embodying algorithms and/or methodologies of one or more embodiments. The program instructions 508 may include operating systems and applications. The program instructions 508 may be compiled or interpreted from computer programs created using a variety of programming languages and/or technologies, including, without limitation, and either alone or in combination, Java, C, C++, C #, Objective C, Fortran, Pascal, Java Script, Python, and Perl.

Upon execution by the processor 504, the computer-executable instructions of the program instructions 508 may cause the computing device 500 to implement one or more of the algorithms and/or methodologies disclosed herein. The non-volatile storage 506 may also include data 510 supporting the functions, features, and processes of the one or more embodiments described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for cloud-based communication management, comprising:
   a cloud server; and
   a non-volatile storage of the cloud server configured to maintain status information for vehicles, wherein the status information is received to the cloud server from the vehicles;
   wherein the cloud server is programmed to
      receive, over a communications network, a request from a requesting device, the request intended to be performed by one of the vehicles,
      categorize the request based on the request and the status information for the one of the vehicles,
      responsive to the request being categorized as able to being deferred, schedule the request including to maintain the request at the cloud server for later processing, responsive to the request being categorized as performable by a mobile edge computing (MEC) device in a cell of the communications network instead of the one of the vehicles, send the request to the MEC device to be processed by the MEC device instead of being performed by the one of the vehicles, responsive to the request being categorized as not being performable by the MEC device but being performable by the one of the vehicles, send the request to the one of the vehicles to be processed by the one of the vehicles, and responsive to the request being categorized as not being performable by the MEC device or by the one of the vehicles, indicate that the request cannot be proceeded with.

2. The system of claim 1, wherein the status information indicates a state of charge of the one of the vehicles, and where the cloud server is further programmed to:

send the request to the MEC device instead of the one of the vehicles based on the state of charge being below a predefined threshold charge, receive the state of charge from the MEC device, and send the state of charge to the requesting device.

3. The system of claim 1, wherein the status information indicates a last reported location of the one of the vehicles, and where the cloud server is further programmed to:

send the request to the MEC device instead of to the one of the vehicles based on the location being within the cell that is served by the MEC device, receive the last reported location from the MEC device, and send the last reported location to the requesting device.

4. The system of claim 1, wherein the status information indicates whether the one of the vehicles is in a parked state or a motive state, and where the cloud server is further programmed to:

send the request to the MEC device instead of to the one of the vehicles based on the one of the vehicles being in the parked state, receive an indication whether the one of the vehicles is in the parked state or the motive state from the MEC device, and send the indication to the requesting device.

5. The system of claim 1, wherein the request is a repeated request of an earlier request, wherein the earlier request was sent to and processed by the one of the vehicles, and where the cloud server is further programmed to:

send the repeated request to the MEC device instead of to the one of the vehicles based on a result of the earlier request being cached to the MEC device, receive a response to the repeated request from the MEC device based on the cached result, and send the cached result to the requesting device.

6. The system of claim 1, wherein the request is for a video feed of the one of the vehicles, and where the cloud server is programmed to:

utilize a substitute video feed from the MEC device instead of the video feed of the one of the vehicles, responsive to the MEC device indicating availability of the substitute video feed.

7. The system of claim 1, wherein the cloud server is further programmed to:

receive updated status information from the vehicles; and store the updated status information to the non-volatile storage.

8. The system of claim 1, wherein the cloud server is further programmed to, responsive to the request not being performable by the MEC device, send an alert to the requesting device to confirm that the cloud server should send the request to one of the vehicles for processing.

9. The system of claim 1, wherein the cloud server is further programmed to, responsive to the request not being performable by the MEC device, send an alert to an owner device or manager device of the one of the vehicles to request confirmation that the cloud server should send the request to the one of the vehicles for processing.

10. The system of claim 1, wherein the cloud server is further programmed to send an indication that the request is rejected responsive to the request not being performable by the MEC device.

11. A method for cloud-based communication management, comprising:

maintaining status information regarding vehicles to a non-volatile storage, wherein the status information is received to a cloud server over a communications network from the vehicles;

receiving, to the cloud server over the communications network, a request from a requesting device, the request intended to be performed by one of the vehicles;

categorizing the request, by the cloud server, based on the request and the status information for the one of the vehicles;

responsive to the request being categorized as able to being deferred, schedule the request including to maintain the request at the cloud server for later processing;

responsive to the request being categorized as performable by a mobile edge computing (MEC) device in a cell of the communications network instead of the one of the vehicles, sending the request by the cloud server to the MEC device to be processed by the MEC device instead of being performed by the one of the vehicles;

responsive to the request being categorized as not being performable by the MEC device but being performable by the one of the vehicles, sending the request to the one of the vehicles to be processed by the one of the vehicles; and responsive to the request being categorized as not being performable by the MEC device or by the one of the vehicles, indicating that the request cannot be proceeded with.

12. The method of claim 11, wherein the status information indicates a state of charge of the one of the vehicles, and further comprising sending the request to the MEC device instead of the one of the vehicles based on the state of charge being below a predefined threshold charge.

13. The method of claim 11, wherein the status information indicates a last reported location of the one of the vehicles, and further comprising sending the request to the MEC device instead of to the one of the vehicles based on the location being within the cell that is served by the MEC device.

14. The method of claim 11, wherein the status information indicates whether the one of the vehicles is in a parked state or a motive state, and further comprising sending the request to the MEC device instead of to the one of the vehicles based on the one of the vehicles being in the parked state.

15. The method of claim 11, wherein the request is a repeated request of an earlier request, and a result of the earlier request is cached to the MEC device allowing the MEC device to respond to the repeated request with the cached result.

16. The method of claim 11, wherein the request is for a video feed of the one of the vehicles, and further comprising utilizing a substitute video feed from the MEC device instead responsive to the MEC device indicating availability of the substitute video feed.

17. The method of claim 11, further comprising:
receiving updated status information from the vehicles; and
storing the updated status information to the non-volatile storage.

18. The method of claim 11, further comprising, responsive to the request not being performable by the MEC device, sending an alert to the requesting device to confirm that the cloud server should send the request to one of the vehicles for processing.

19. The method of claim 11, further comprising, responsive to the request not being performable by the MEC device, sending an alert to an owner device or manager device of the one of the vehicles to request confirmation confirm that the cloud server should send the request to the one of the vehicles for processing.

20. The method of claim 11, further comprising sending an indication that the request is rejected responsive to the request not being performable by the MEC device.

21. A non-transitory computer readable medium comprising instructions for cloud-based communication management that, when executed by a cloud server in communications over a communications network, cause the cloud server to perform operations comprising to:
periodically receive status information sent from vehicles, the status information indicative of vehicle location, state of charge, whether the vehicles are being used as a power source, and whether the vehicles are in a parked state or a motive state;
maintain the status information regarding the vehicles to a non-volatile storage;
receive, over the communications network, a request from a requesting device, the request intended to be performed by one of the vehicles;
categorize the request based on the request and the status information for the one of the vehicles;
responsive to the request being categorized as being performable by a mobile edge computing (MEC) device in a cell of the communications network instead of the one of the vehicles, send the request to the MEC device to be processed by the MEC device instead of being performed by the one of the vehicles;
responsive to the request being categorized as not being performable by the MEC device but being performable by the one of the vehicles, send the request to the one of the vehicles to be processed by the one of the vehicles; and
responsive to the request being categorized as not being performable by the MEC device or by the one of the vehicles, indicate that the request cannot be proceeded with.

22. The medium of claim 21, further comprising instructions that, when executed by the cloud server, cause the cloud server to perform operations including one or more of to:
send the request to the MEC device instead of the one of the vehicles based on the state of charge being below a predefined threshold charge;
send the request to the MEC device instead of to the one of the vehicles based on the location being within the cell that is served by the MEC device; or
send the request to the MEC device instead of to the one of the vehicles based on the one of the vehicles being in the parked state.

23. The medium of claim 21, wherein the request is a repeated request of an earlier request, and a result of the earlier request is cached to the MEC device allowing the MEC device to respond to the repeated request with the cached result.

24. The medium of claim 21, wherein the request is for a video feed of the one of the vehicles, and further comprising instructions that, when executed by the cloud server, cause the cloud server to perform operations including to utilize a substitute video feed from the MEC device instead responsive to the MEC device indicating availability of the substitute video feed.

25. The medium of claim 21, further comprising instructions that, when executed by the cloud server, cause the cloud server to perform operations including one or more of to:
responsive to the request not being performable by the MEC device, send an alert to the requesting device to confirm that the cloud server should send the request to the one of the vehicles for processing;
responsive to the request not being performable by the MEC device, send the alert to an owner device or manager device of the one of the vehicles to request confirmation confirm that the cloud server should send the request to the one of the vehicles for processing; or
send an indication that the request is rejected responsive to the request not being performable by the MEC device.

\* \* \* \* \*